PHONOGRAPH PICKUP

Filed Sept. 17, 1962 3 Sheets-Sheet 1

Inventor
John F. Wood

By:
Stone, Merman, Burmeister & Zummer
Attorneys

Inventor
John F. Wood
By:
Stone, Nierman, Burmeister & Zummer
Attorneys

April 11, 1967 J. F. WOOD 3,313,891

PHONOGRAPH PICKUP

Filed Sept. 17, 1962 3 Sheets-Sheet 3

Inventor
John F. Wood
By:
Stone, Mirman, Burmeister & Zummer
Attorneys

United States Patent Office 3,313,891

Patented Apr. 11, 1967

3,313,891

PHONOGRAPH PICKUP

John F. Wood, Guaynabo, Puerto Rico, assignor to Electro-Voice, Incorporated, Buchanan, Mich., a corporation of Indiana Filed Sept. 17, 1962, Ser. No. 223,883
7 Claims. (Cl. 179—100.41)

This application is a continuation-in-part of application Ser. No. 741,517, filed June 12, 1958, now Patent No. 3,056,860.

The present invention relates generally to phonograph pickups, and more particularly to pickups for stereophonic records.

Recently, phonograph records have been developed with two sound channels impressed upon a single record groove in order to provide stereophonic reproduction. When recording the record, two separate sound channels are employed, the microphones of the two channels being spaced from each other. The two sound channels are impressed upon the cutting mechanism for the record groove so that a single groove simultaneously carries the modulations of the two recording channels. Two systems are presently being employed to impress the two recording channels upon a single groove. The one system simultaneously modulates the cutting head with the two channels by impressing one channel normal to the record surface and the other channel parallel to the record surface. The other system orients one recording axis normal to the other with both axes being approximately 45 degrees to the record surface.

A number of different types of pickups for stereophonic phonographs have been developed. Electromagnetic pickups which employ two electromagnetic transducers coupled to a single stylus have been employed. Another type of pickup employs two piezoelectric elements mechanically linked to a single stylus. Also, the patent application of Alpha M. Wiggins and the present inventor entitled, "Piezoelectric Transducer," Ser. No. 721,188, discloses a single element piezoelectric pickup for reproducing stereophonic records.

It is one of the objects of the present invention to provide a phonograph pickup for stereophonic records emplying a single piezoelectric element which achieves more complete isolation between the electrical responses of the two channels. The single element piezoelectric phonograph pickups heretofore employed have exhibited relatively poor electrical isolation between channels, partially due to the fact that displacement of the stylus tends to twist as well as bend the piezoelectric element, thus producing an electrical response in both channels.

It is also an object of the present invention to provide a piezoelectric phonograph pickup which requires only three electrical connections. Conventionally, a piezoelectric phonograph pickup requires four connections to the piezoelectric element, or elements if more than one element is employed, and may in addition require a fifth connection to ground the pickup.

The patent application of Howard M. Durbin entitled, "Record Reproducer," Ser. No. 736,820, now abandoned, discloses a phonograph pickup suitable for reproducing stereophonic records which are recorded with two channels disposed at 45 degrees to the record surface in which rumble resulting from spurious vertical displacement of the stylus is substantially eliminated. As disclosed in this application, an electrical coupling element is connected between two of the electrodes of a four electrode piezoelectric transducer. It is a further object of the invention to provide a piezoelectric phonograph transducer of simplified construction which achieves rumble suppression.

Further, the phonograph pickup described in the Durbin application results in a decrease in bass response. It is a further object of the present invention to provide a phonograph pickup with rumble suppression with improved frequency response characteristics.

Additionally, it is an object of the present invention to provide a stereophonic piezoelectric phonograph pickup which is simple in construction and may be produced at modest cost.

These and additional objects of the present invention will be more fully understood from a further reading of this disclosure, particularly when wieved in the light of the drawings, in which.

Figure 1:
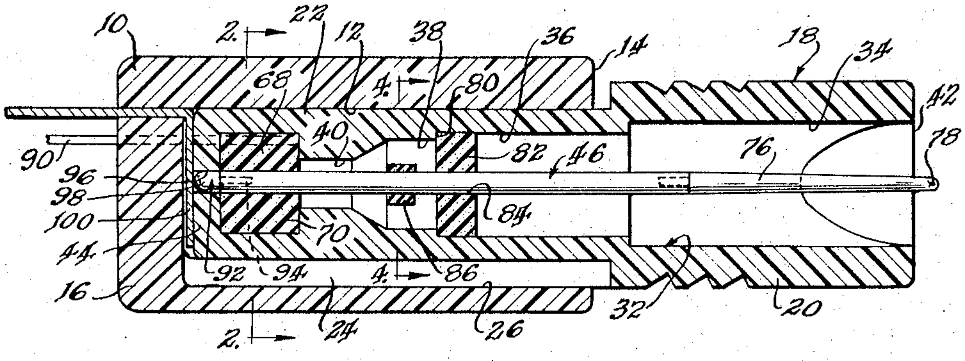
FIGURE 1 is a longitudinal sectional view of a phonograph pickup constructed according to the teachings of the present invention.

The phonograph pickup illustrated in FIGURES 1 through 5 employs a sleeve 10 which is secured to a tone arm of a phonograph, and may be a portion of a turnover mechanism, such as disclosed in the inventor's Patent No. 2,793,254 entitled, "Cartridge Case and Turnover Mechanism." The sleeve 10 has a cavity 12 extending therein from one end 14, the other end 16 of the sleeve 10 being closed. A cartridge 18 is removably disposed within the cavity 12 of the sleeve.

The cartridge 18 has a housing 20 with a cylindrical portion 22 disposed within the cavity 12. The cylindrical portion 22 has an outwardly extending rib 24 parallel to the axis thereof, and the rib 24 is slidably disposed within a keyway 26 of the sleeve 10. The sleeve 10 is also provided with a pair of confronting grooves 28 and 30 disposed on opposite sides of the sleeve and equally spaced from the keyway 26. The grooves 28 and 30 accommodate electrical contacts of the cartridge 18, which will be described hereinafter.

The cartridge 18 has an axial cavity 32, and the cavity 32 has four portions 34, 36, 38 and 40 of diminishing diameter extending from a mouth 42 into the housing 20, and terminating in a closed end 44 of the housing 20. A piezoelectric element 46 is disposed along the axis of the cavity 32, and resiliently mounted at its end adjacent to the closed end 44 of the housing 20.

Figure 4:
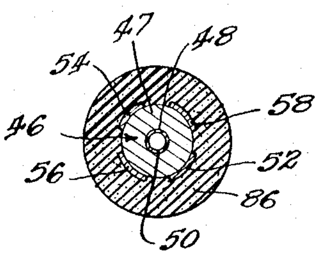
FIGURE 4 is a sectional view taken along the line 4—4 of FIGURE 1.

The piezoelectric element 46 has an elongated body 47 of artificial piezoelectric material, such as electrically polarized barium titanate or lead zirconium titanate, and the body is provided with an axial bore 48 provided with a coating 50 of electrically conducting material, such as silver. Two pairs of electrically conducting electrodes are disposed in spaced relation about the perimeter of the piezoelectric body 47, the elements of each pair being disposed on opposite sides of the axis of the piezoelectric body 47. As illustrated in FIGURE 4, the first pair of electrodes are designated 52 and 54, and the second pair of electrodes are designated 56 and 58. The electrodes are in the form of elongated strips disposed parallel to the bore 48 in the body 47, and in the figures, the electrodes are illustrated as elongated cylindrical segments disposed upon the cylindrical surface of the body 47, although it is to be understood that the body and electrodes may partake of other cross-sections, such as flat surfaces, without departing from the invention.

Figure 2:
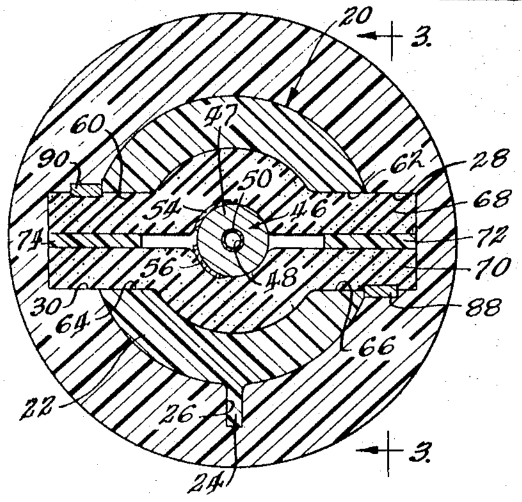
FIGURE 2 is a sectional view taken along the line 2—2 of FIGURE 1.
Figure 3:
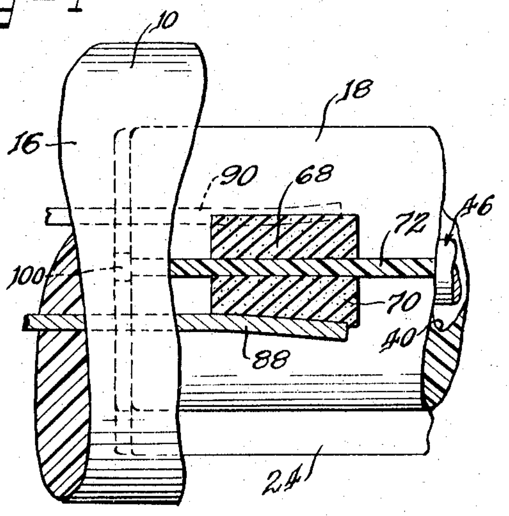
FIGURE 3 is a sectional view of the phonograph cartridge taken along the line 3—3 of FIGURE 2.

One end of one of the electrodes of each pair, electrodes 52 and 58 in the FIGURE 2, is removed from the portion of the body 47 adjacent to the closed end 44 of the housing 20, or omitted therefrom, so that only one electrode of each pair extends to the closed end 44. The housing 20 is provided with two pairs of apertures confronting the inner end of the piezoelectric element 46, one pair being designated 60 and 62, and the other pair 64 and 66. One of the apertures of each pair confronts the portion of the body 47 from which an electrode has been removed or otherwise omitted. A strip 68 of electrically conducting rubber extends through the apertures 60 and 62 and abuts the electrode 54, and a second strip 70 of electrically conducting rubber extends through the apertures 64 and 66 and abuts the electrode 56. The piezoelectric element 46 is resiliently secured between the two strips 68 and 70 of electrically conducting rubber. Also, the strips 68 and 70 extend from the apertures into the grooves 28 and 30 of the sleeve 10, so that electrical connection to these strips may be made within these grooves. The housing 20 is also provided with a pair of outwardly extending ribs 72 and 74 which are disposed between the strips 68 and 70, respectively, to assure adequate electrical insulation between the strips.

Figure 5:
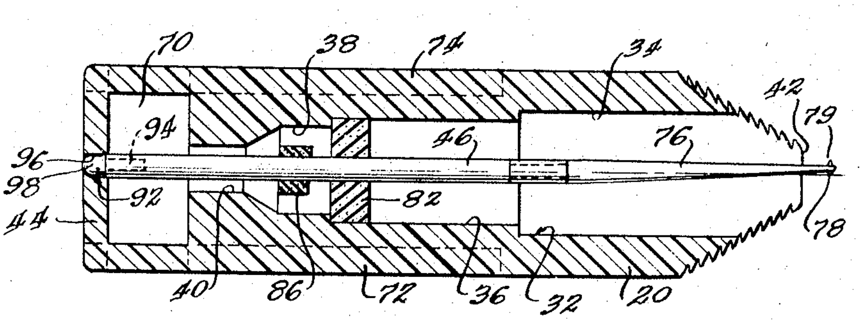
FIGURE 5 is a longitudinal sectional view of the phonograph pickup normal to the plane of FIGURE 1.

The end of the piezoelectric element 46 opposite the closed end 44 of the cavity 34 is secured to a body 76 which is rigid in all directions normal to the axis of the element and extends through the mouth 42 of the cavity. The body 76 may be constructed of plastic and forms an extension to the element 46. A short rigid stylus 78 is rigidly mounted to the body 76 exterior to the mouth of the cavity, and as illustrated in FIGURE 5, the stylus 78 terminates on the extension of the axis of the piezoelectric element 46. In order to accomplish this, the body 76 extends from the element 46 as an acute angle. By placing the tip of the stylus 78 on the axis of the element 46, horizontal displacements of the stylus are impressed upon the element 46 along a plane passing through its axis, and the tendency for the element 46 to twist with such displacements is minimized. A second stylus 79 for following records with wider grooves is also secured to the end portion of the body on the side thereof opposite the stylus 78.

The inner end of the portion 36 of the cavity 34 terminates at a shoulder 80, and an annular snubber 82 constructed of compliant material is secured to the housing 20 abutting the shoulder 80. The snubber 82 has an axial opening 84 which abuts the piezoelectric element 46. The snubber 82 may be constructed or rubber or compliant plastic.

An electrically conducting ring 86 of compliant material, such as electrically conducting rubber, is disposed about the piezoelectric element 46 in the portion 38 of the cavity 34, as illustrated in FIGURES 1, 4, and 5. The ring 86 abuts all four electrodes 52, 54, 56, and 58 of the element 46. It is the function of the ring 86 to provide electrical contact between all four of the electrodes, and in effect to interconnect the four electrodes by resistance. The electrical properties of this construction will be further described hereinafter.

Electrical contact need be made only to one of the electrodes of each pair, as a result of the interconnection of the electrodes by the electrically conducting ring 86.

The electrically conducting strips 68 and 70 extend to the exterior of the housing 20, and metallic contact bars 88 and 90 abut the strips 70 and 68, respectively. The contact bar 88 is mounted in the groove 28 in the sleeve 10 to abut the strip 70 and extends through and is anchored by the closed end 16 of the sleeve 10, and the contact bar 90 extends along the groove 30 of the sleeve 10 to abut the strip 68 and extends through and is anchored by the closed end 16 thereof. The bars 88 and 90 are parallel to the axis of the sleeve 10 adjacent to the closed end 16 thereof, and bend away therefrom near their inner ends, so that the strips 68 and 70 are firmly wedged against the contact bars 88 and 90. In this manner, electrical connection is made to the exterior of the sleeve 10, in a manner related to that disclosed in the copending application of the inventor entitled "Phonograph Pickup Cartridge," Ser. No. 690,724, now Patent No. 3,057,971.

An electrically conducting rubber bar 92 has a portion 94 of restricted diameter snugly wedged within the channel 48 of the piezoelectric body 47 in contact with the coating 50, and the bar protrudes from the end of the channel 48. The closed end 44 of the housing 20 is provided with a bore 96 confronting the end of the channel 48, and an enlarged diameter portion 98 of the bar 92 extends through the bore 96 to protrude from the closed end 44 of the housing 20 of the cartridge. An electrically conducting contact strip 100 extends along the surface of the closed end 16 of the sleeve and abuts the exposed portion of the electrically conducting bar 92. The strip 100 is provided with a normal bend and extends through the closed end 16 of the sleeve 10.

The strip 92 is constructed of resilient electrically conducting material, and, therefore, does not appreciably affect the mechanical operation of the piezoelectric element 46, since there is no solid connection between the element and the casing in the inner end of the element. The electrically conducting rubber employed for the bar 92 and the contact strips 68 and 70 is selected for good electrical conductivity, and, in addition, the bars 68 and 70 must possess the proper compliance to produce optimum electrical response. A suitable electrically conducting rubber is as follows:

| | Parts |
|---|---|
| Natural rubber (crepe) | 100 |
| Reogen; a mixture of oil soluble sulphonic acid with paraffin oil | 10 |
| Zinc oxide | 4 |
| Stearic acid | 1 |
| Paraffin | 2 |
| Lamp black | 100 |
| Tetramenthylthiuram-disulfide | 3 |
| Mercapto-benzothiazole | .5 |
| Altax (benzothiazol disulfide) | 1 |

The number of terminals required for the stereophonic pickup may be reduced to three by employing a common ground terminal and one terminal for each channel. A common ground is best achieved by connecting the electrically conducting coating 50 of the channel 48 to ground, and this is accomplished in the construction shown in FIGURES 1 through 5 by the electrically conducting bar 92 and contact strip 100. It is to be understood that the common element of the piezoelectric transducer need not be a channel on the axis of the body 47, but could equally well be an element disposed on the exterior surface of the body 47 between the electrodes of each pair as a result of the shape of the body. With the proper polarization of the body 47, the electrodes of each pair may be interconnected, thereby requiring but a single terminal for each channel and a common ground.

Figure 6:
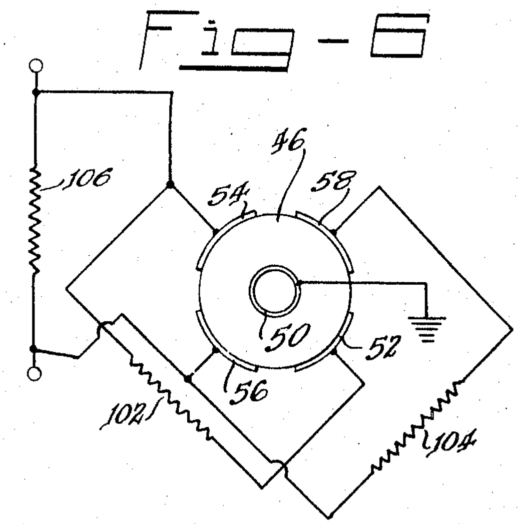
FIGURE 6 is a schematic electrical circuit diagram illustrating the electrical connection to the piezoelectric transducer.

FIGURE 6 illustrates the electrical connection for a stereophonic piezoelectric pickup in which the electrodes of each pair are interconnected by resistors. Electrodes 52 and 54 are interconnected by resistor 102, and electrodes 56 and 58 are interconnected by resistor 104. The electrodes 54 and 56 are also interconnected by a resistor 106. The resistor 106, as explained in the application of Howard M. Durbin, Ser. No. 736,820, has the effect of coupling the low frequency output of the two channels from the piezoelectric element 46 together for the purpose of reducing rumble. However, the frequency response of the pickup in the low frequency region is reduced due to the loss of the vertical component in the Durbin construction. The resistors 102 and 104 are selected to have the same resistance as the resistor 106 and couple in the additional capacity of opposite segments of the generating element, thereby re-enforcing the low frequency response.

The resistances 102, 104, and 106 may be conventional resistors, and these resistors are of approximately the same value. Where the piezoelectric element is polarized lead zirconium titanate, as disclosed in the application of Wiggins and the present inventor referred to above, and the load into which each of the channels is working is approximately 1 megohm, each of the resistors 102, 104, and 106 has a value of approximately 2 megohms. The capacity between each electrode and the electrically conducting coating 50 affects the optimum resistance values, and in the above construction is approximately 400 micromicrofarads.

Figure 7:
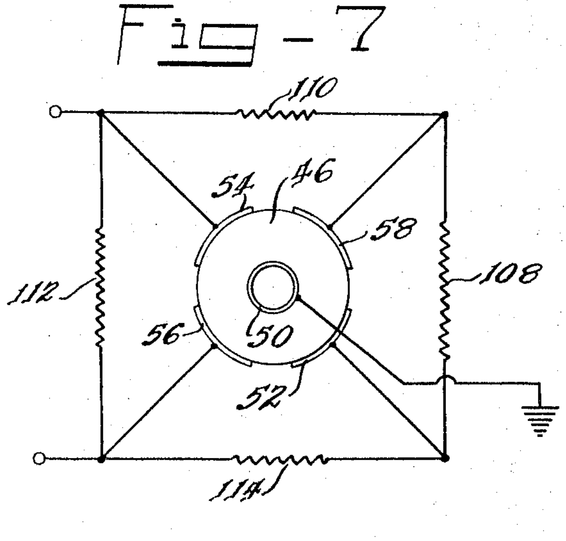
FIGURE 7 is a schematic electrical circuit diagram illustrating another embodiment of the electrical connections for the pickup.

FIGURE 7 shows a modified construction for the electrical contacts from a stereophonic piezoelectric phonograph cartridge. In this construction, the center electrode 50 is again grounded, but each electrode is electrically connected to an adjacent electrode through a resistor. The electrode 52 is connected to the electrode 58 by a resistor 108, the electrode 58 is connected to the electrode 54 by a resistor 110, the electrode 54 is connected to the electrode 56 by a resistor 112, and the electrode 56 is connected to the electrode 52 by a resistor 114. All of the resistors 108, 110, 112, and 114 are approximately the same value, and in one particular construction approximately 4 megohms each. In this construction, the effective coupling resistance between the electrodes 54 and 56 is approximately the same as that illustrated in FIGURE 6. Further, the resistors may all be physically embodied in an electrically conducting ring disposed about the piezoelectric element and abutting the two pairs of electrodes thereof, as described in FIGURES 1 through 5. This electrically conducting ring, illustrated as a separate ring 86 in these figures, could equally well be a structural element aiding in the support of the piezoelectric element to the housing 20, such as the snubber element 82. It is preferable for the ring to be constructed of compliant material, such as rubber, so that it will maintain contact with the electrodes of the piezoelectric element 46. It is readily apparent, that this construction eliminates the necessity of making electrical contacts between the elements or mounting resistors to the elements. The inventor has found the following composition to be particularly suitable for the electrically conducting ring:

| | Parts |
|---|---|
| Natural rubber (crepe) | 100 |
| Acetylene black | 55 |
| Reogen | 10 |
| Zinc oxide | 4 |
| Stearic acid | 1 |
| Paraffin | 2 |
| Tetramenthylthiuram-disulfide | 3 |
| Captax (mercapto-benzothiazole) | .5 |
| Altax (benzothiazol disulfide) | 1 |

The body 76 illustrated in the foregoing embodiment of the invention is rigid in all directions, and this construction is preferable in order to obtain the most desirable frequency response characteristics and maximum output from the piezoelectric element 46. The body 76, however, can only be rigid if sufficient compliance exists in the piezoelectric element 46 and the resilient mounting means at the end of the element opposite from the body 76, so that the entire system does not possess excessive stiffness. If these elements are not sufficiently compliant, the phonograph stylus will be unable to follow the record groove under all conditions unless excessive stylus to record pressure is applied. It has been found desirable with most commercially available piezoelectric elements to reduce the stylus to record pressure by employing a compliant body of non-resilient material to improve the ability of the pickup to follow the record groove and improve isolation between the two sound channels.

Figure 10:
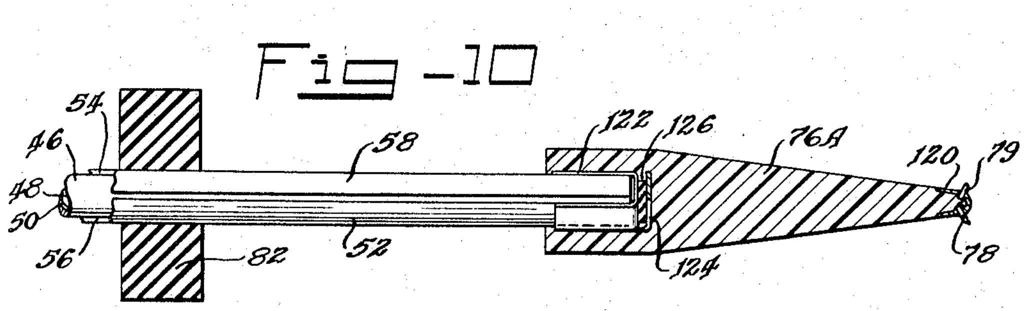
FIGURE 10 is a fragmentary longitudinal sectional view of another portion of the phonograph pickup illustrated in FIGURE 8.

For this reason, the embodiment illustrated in FIGURE 10 shows a body 76A of compliant material, such as rubber or soft plastic. Polyvinyl chloride has proven to be a particularly suitable plastic in that sufficient compliance may be obtained with polyvinyl chloride while still permitting the styli 78 and 79 to be mounted in indentations, as in the body 76. Softer materials, such as rubber, require a stylus mount 120 in the form of a generally U-shaped metallic strip which is wedged about the pointed end of the body 76A opposite the element 46. The styli 78 and 79 are secured to the mount 120.

The body 76A must not only be compliant, but must also possess resistance, that is constitute a damping element, in order to prevent resonances from occurring. The greater the compliance of the body 76A, the less the stiffness of the pickup and the lower the required stylus to record pressure. However, the compliance of the body must be accompanied by damping. The inventor has found that a body must have at least the damping of semi-rigid polyvinyl chloride.

FIGURE 10 also illustrates an alternative construction for interconnecting opposite electrodes 52 and 54, and 56 and 58, which may be used in place of the electrically conducting rubber ring 86. Two U-shaped metallic clips 122 and 124 are disposed about the end of the element 46 within the body 76A, the clips 122 and 124 are of electrically conducting material and short opposite electrodes 52 and 54, and 56 and 58, respectively. The clips are electrically insulated from each other by a layer 126 of electrically insulating material disposed between confronting portions.

Figure 8:
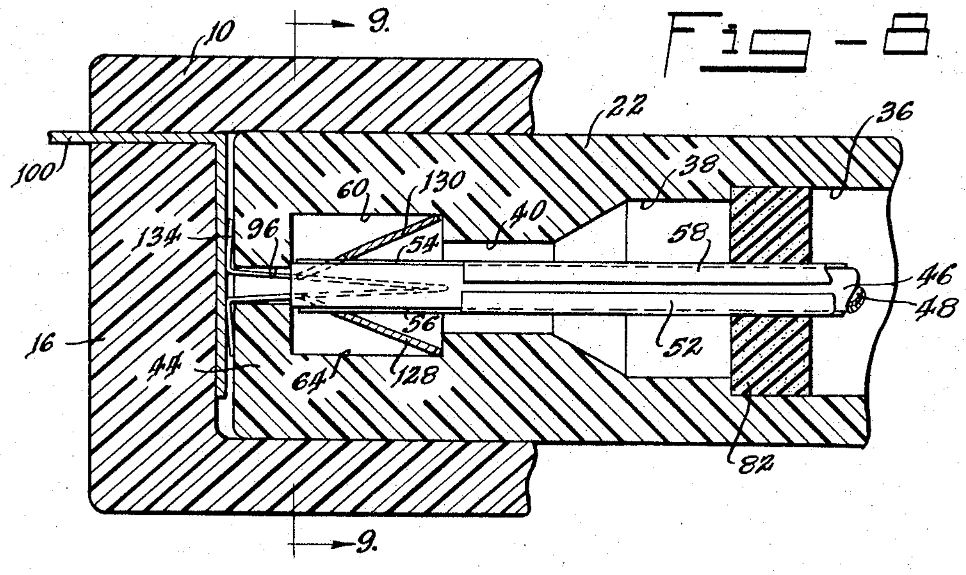
FIGURE 8 is a longitudinal sectional view of a portion of a phonograph pickup illustrating another embodiment of the present invention.
Figure 9:
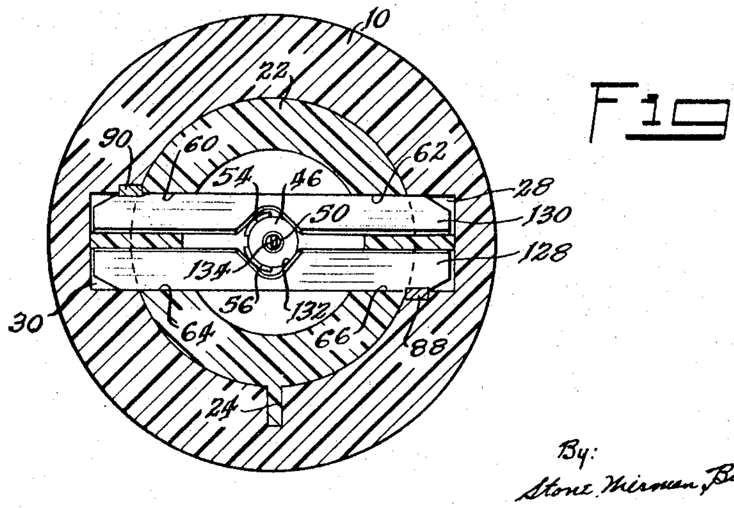
FIGURE 9 is a sectional view taken along the line 9—9 of FIGURE 8.

FIGURES 8 and 9 also illustrate an alternative construction for mounting the piezoelectric element 46 to the housing 20. As illustrated in these figures, the element 46 is disposed between two electrically conducting plates 128 and 130. The plates 128 and 130 are provided with V-shaped notches 132 which abut the element 46, one of the plates 128 contacting the electrode 56, and the other plate 130 contacting the electrode 54. One of the plates 128 is wedged diagonally within the openings 64 and 66 of the housing 20, and the other plate 130 is diagonally wedged within the openings 60 and 62. The plates 128 and 130 are mounted diagonally within the openings to contact the element 46 as close to the closed end 44 of the housing 20 as possible, and hold the element with approximately equal compliance in all directions.

As is illustrated in FIGURE 8, contact to the coating 50 on the boer 48 of the element 46 is made by means of a contact spring 134 which has a V-shaped portion wedged within the bore 48. The ends of the spring 134 extend from the bore 96 of the housing 20, and are bent outwardly to abut the contact strip 100.

It will be apparent from the foregoing disclosure that the inventor has provided a stereophonic phonograph pickup which is simple to assemble and has a relatively low construction cost. Further, the electrical response of the element is improved, in that the frequency response approaches the desired linear relationship throughout the range of interest. Those skilled in the art will readily devise many modifications and embodiments of the present invention within the spirit of the present invention. It is, therefore, intended that the scope of the present invention be not limited by the foregoing disclosure, but rather only by the appended claims.

The invention claimed is:

1. A phonograph cartridge for stereophonic records comprising a casing having a cavity therein, a signal generating element disposed within the cavity and mounted on the casing adjacent to one end, said element having an elongated piezoelectric body and two pairs of spaced electrodes disposed on opposite sides of the axis of the element, said body having a channel extending therein from one end and an inner electrode disposed within the channel in contact with the body, said element responsive to a force exerted on the other end thereof generating equal first potentials between the inner electrode and each electrode of one pair and equal second potentials between the inner electrode and each electrode of the other pair, the magnitude of the said first and second potentials being determined by the direction and magnitude of the force impressed on the element, a first resistor connected between one electrode of one pair and an electrode of the other pair, a second resistor connected between the electrodes of the first pair, a third resistor connected between the electrodes of the second pair, an electrically conducting means mounted to the casing abutting the electrode of each pair connected to the first resistor, and electrical contact means abutting the inner electrode of the element.

2. A phonograph cartridge for stereophonic records comprising a casing having a cavity therein, a signal generating element disposed within the cavity and mounted on the casing adjacent to one end, said element having an elongated piezoelectric body and two pairs of spaced electrodes disposed on opposite sides of the axis of the element, said body having a channel extending therein from one end and an inner electrode disposed within the channel in contact with the body, said element responsive to a force exerted on the other end thereof generating equal first potentials between the inner electrode and each electrode of one pair and equal second potentials between the inner electrode and each electrode of the other pair, the magnitude of the said first and second potentials being determined by the direction and magnitude of the force impressed on the element, a first resistor connected between the first electrode of the first pair and the first electrode of the second pair, a second resistor connected between the first electrode of the second pair and the second electrode of the first pair, a third resistor connected between the second electrode of the first pair and the second electrode of the second pair, and a fourth resistor connected between the second electrode of the second pair and the first electrode of the first pair, electrically conducting means mounted to the casing abutting the first electrode of the first pair and the first electrode of the second pair, and electrical contact means abutting the inner electrode of the element.

3. A phonograph cartridge for stereophonic records comprising the elements of claim 2 wherein the first, second, third, and fourth resistors comprise a ring of electrically conducting rubber disposed about the generating element in contact with the two pairs of electrodes.

4. A signal generating device comprising an elongated body of piezoelectric material having two pairs of spaced electrodes disposed on opposite sides of the axis of elongation of the body, said generating element being provided with an electrode in contact with the body between the two pairs of electrodes, means for mounting the element on the casing adjacent to one end thereof, said element responsive to a force exerted on the other end thereof generating equal first potentials between the inner electrode and each electrode of one pair and equal second potentials between the inner electrode and each electrode of the other pair, the magnitude of the said first and second potentials being determined by the direction and magnitude of the force impressed on the element, a first resistor connected between the first electrode of the first pair and the first electrode of the second pair, a second resistor connected between the first electrode of the second pair and the second electrode of the first pair, a third resistor connected between the second electrode of the first pair and the second electrode of the second pair, and a fourth resistor connected between the second electrode of the second pair and the first electrode of the first pair.

5. A signal generating device comprising the combination of claim 4 wherein the first, second, third, and fourth resistors comprise a ring of electrically conducting rubber disposed about the body in electrical contact with the two pairs of electrodes.

6. A signal generating device comprising an elongated body of piezoelectric material having two pairs of spaced electrodes disposed on opposite sides of the axis of elongation of the body, said generating element being provided with an electrode in contact with the body between the two pairs of electrodes, means for mounting the element on the casing adjacent to one end thereof, said element responsive to a force exerted on the other end thereof generating equal first potentials between the inner electrode and each electrode of one pair and equal second potentials between the inner electrode and each electrode of the other pair, the magnitude of the said first and second potentials being determined by the direction and magnitude of the force impressed on the element, a first resistor connected between one electrode of the first pair and one electrode of the second pair, a second resistor connected between the electrodes of the first pair, and a third resistor connected between the electrodes of the second pair.

7. A stereophonic phonograph pickup comprising a cartridge holder having a recess therein and three electrical terminals exposed therefrom and located within the recess, a phonograph cartridge removably disposed within the recess having three electrical terminals in contact with the three terminals of the holder, said cartridge having a first piezoelectric generator electrically connected between two of said terminals and a second piezoelectric generator connected between the third terminal and one of the two terminals, and a resistor connected between the other of the first two terminals and the third terminal.

References Cited by the Examiner

UNITED STATES PATENTS

| | | | |
|---|---|---|---|
| 2,518,348 | 8/1950 | Mason | 73—54 |
| 2,769,867 | 11/1956 | Crownover | 179—110 |
| 2,900,536 | 8/1959 | Palo | 310—9.6 |
| 2,955,216 | 10/1960 | Dieter | 310—9.4 |
| 2,958,738 | 11/1960 | Gray | 179—100.4 |

FOREIGN PATENTS

| | | |
|---|---|---|
| 227,374 | 3/1960 | Australia. |

BERNARD KONICK, *Primary Examiner.*

IRVING L. SRAGOW, *Examiner.*

R. J. GARBACIK, T. W. FEARS, *Assistant Examiners.*